United States Patent
Holton et al.

(10) Patent No.: US 10,815,742 B2
(45) Date of Patent: Oct. 27, 2020

(54) SEPARATOR AND METHOD OF SEPARATION WITH A PRESSURE DIFFERENTIAL DEVICE

(71) Applicant: M-I L.L.C., Houston, TX (US)

(72) Inventors: Benjamin Lanning Holton, Covington, KY (US); Mitchell Landwehr, Villa Hills, KY (US); John H. Fedders, Florence, KY (US)

(73) Assignee: M-I L.L.C., Houston, TX (US)

( * ) Notice: Subject to any disclaimer, the term of this patent is extended or adjusted under 35 U.S.C. 154(b) by 270 days.

(21) Appl. No.: 15/756,584

(22) PCT Filed: Aug. 31, 2016

(86) PCT No.: PCT/US2016/049560
§ 371 (c)(1),
(2) Date: Mar. 1, 2018

(87) PCT Pub. No.: WO2017/040568
PCT Pub. Date: Mar. 9, 2017

(65) Prior Publication Data
US 2018/0179837 A1    Jun. 28, 2018

Related U.S. Application Data

(60) Provisional application No. 62/213,051, filed on Sep. 1, 2015.

(51) Int. Cl.
*E21B 21/06* (2006.01)
*B01D 35/20* (2006.01)
(Continued)

(52) U.S. Cl.
CPC ............ *E21B 21/065* (2013.01); *B01D 35/20* (2013.01); *B07B 1/28* (2013.01); *B07B 13/16* (2013.01);
(Continued)

(58) Field of Classification Search
CPC ......... E21B 21/065; B01D 35/20; B07B 1/28; B07B 13/16; B07B 2201/00; B07B 2201/04
(Continued)

(56) References Cited

U.S. PATENT DOCUMENTS

| 4,871,454 A | 10/1989 | Lott |
| 8,613,360 B2 | 12/2013 | Carr |

(Continued)

FOREIGN PATENT DOCUMENTS

| WO | 2015/024012 A1 | 2/2015 | |
| WO | WO-2015024012 A1 * | 2/2015 | ............... B07B 1/28 |
| WO | 2015/081200 A1 | 6/2015 | |

OTHER PUBLICATIONS

International Search Report and Written Opinion for the equivalent International patent application PCT/US2016/049560 dated Dec. 27, 2016.

(Continued)

*Primary Examiner* — Terrell H Matthews
(74) *Attorney, Agent, or Firm* — Jeffrey D. Frantz

(57) ABSTRACT

A system including a vibratory separator includes at least one screen and a pressure differential system. The pressure differential system includes a pressure differential generating device, a tray coupled to the pressure differential generating device, and an adjustable mounting mechanism configured to couple the tray within the vibratory separator and adjust a distance between the tray and the at least one screen of the vibratory separator.

18 Claims, 8 Drawing Sheets

(51) Int. Cl.
  *B07B 1/28* (2006.01)
  *B07B 13/16* (2006.01)
  *F26B 9/08* (2006.01)

(52) U.S. Cl.
  CPC .......... *F26B 9/082* (2013.01); *B07B 2201/00* (2013.01); *B07B 2201/04* (2013.01); *B07B 2230/01* (2013.01)

(58) Field of Classification Search
  USPC ........................................................ 209/245
  See application file for complete search history.

(56) References Cited

U.S. PATENT DOCUMENTS

| 2001/0042721 | A1  | 11/2001 | Hodges et al. | |
| 2008/0078699 | A1* | 4/2008  | Carr | B01D 33/009 |
| | | | | 209/233 |
| 2009/0301939 | A1  | 12/2009 | Sorensen | |
| 2013/0228532 | A1* | 9/2013  | Carr | B01D 19/0036 |
| | | | | 210/780 |
| 2015/0048037 | A1* | 2/2015  | Frazier | E21B 21/065 |
| | | | | 210/808 |
| 2017/0022771 | A1* | 1/2017  | Frazier | B01D 21/2494 |

OTHER PUBLICATIONS

Office Action for the equivalent Norwegian patent application 20180310 dated Apr. 11, 2019.

International Preliminary Report on Patentability for the equivalent International patent application PCT/US2016/049560 dated Mar. 15, 2018.

Office Action for the equivalent Norwegian patent application 20180310 dated Nov. 2, 2019.

* cited by examiner

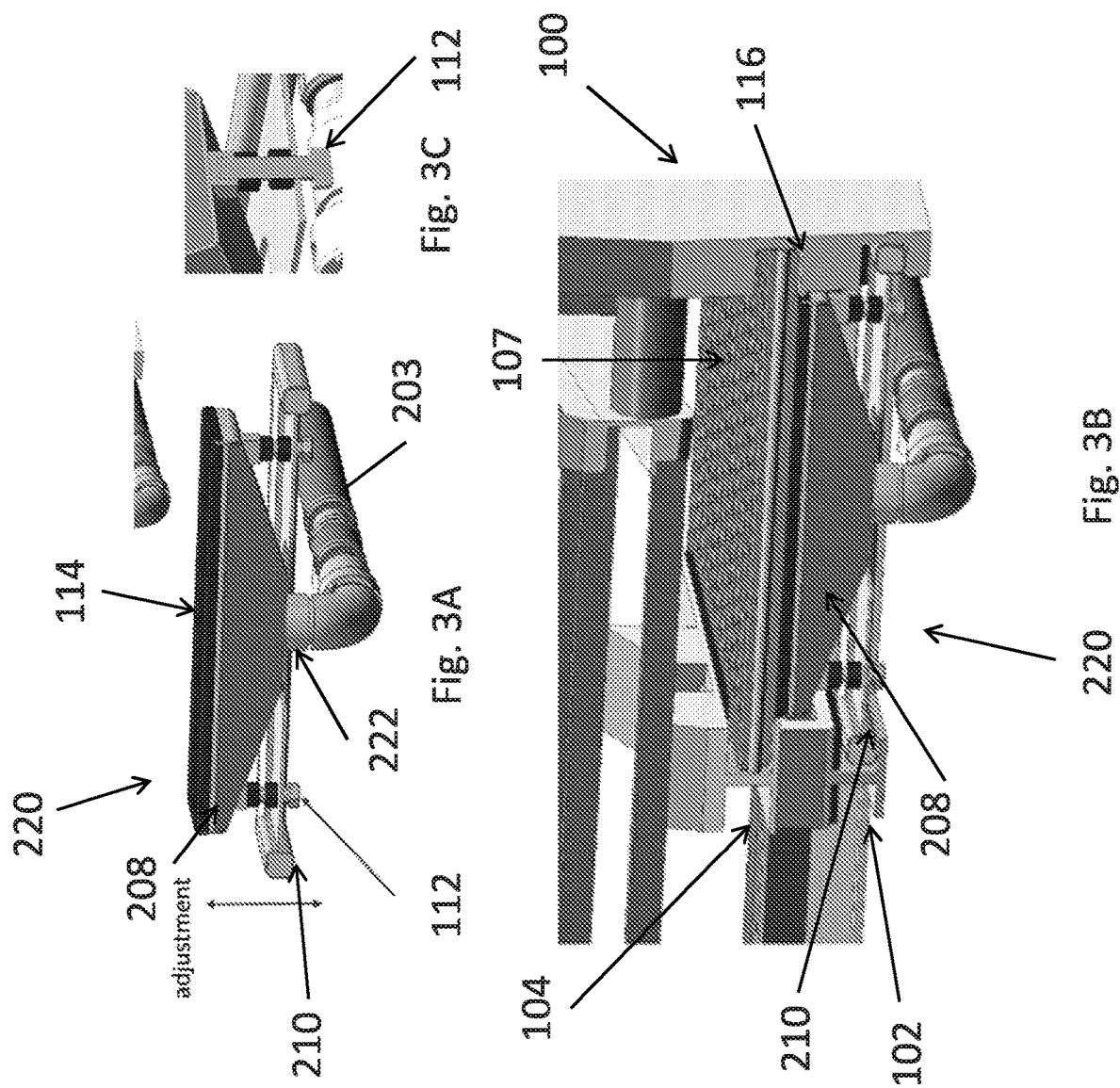

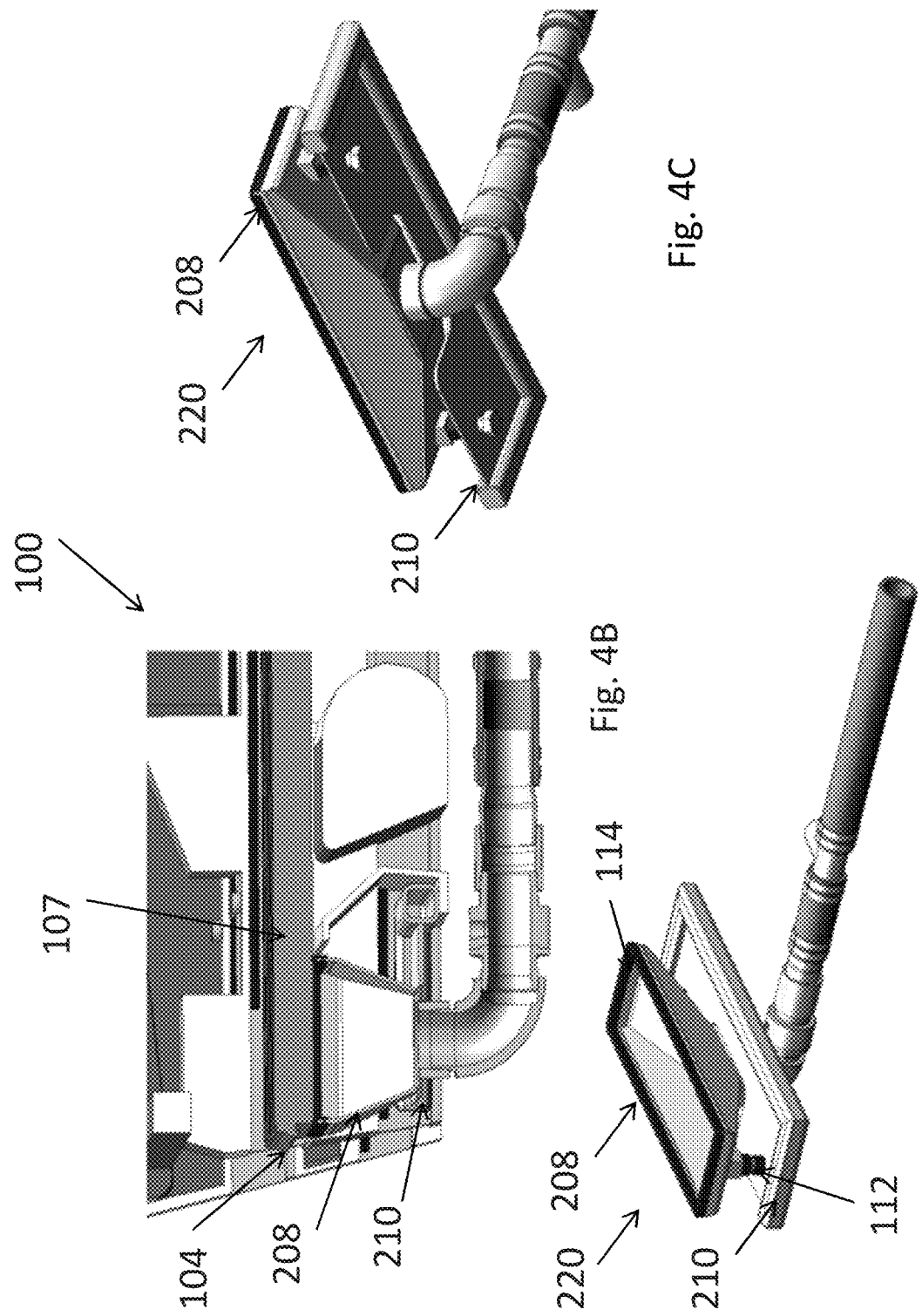

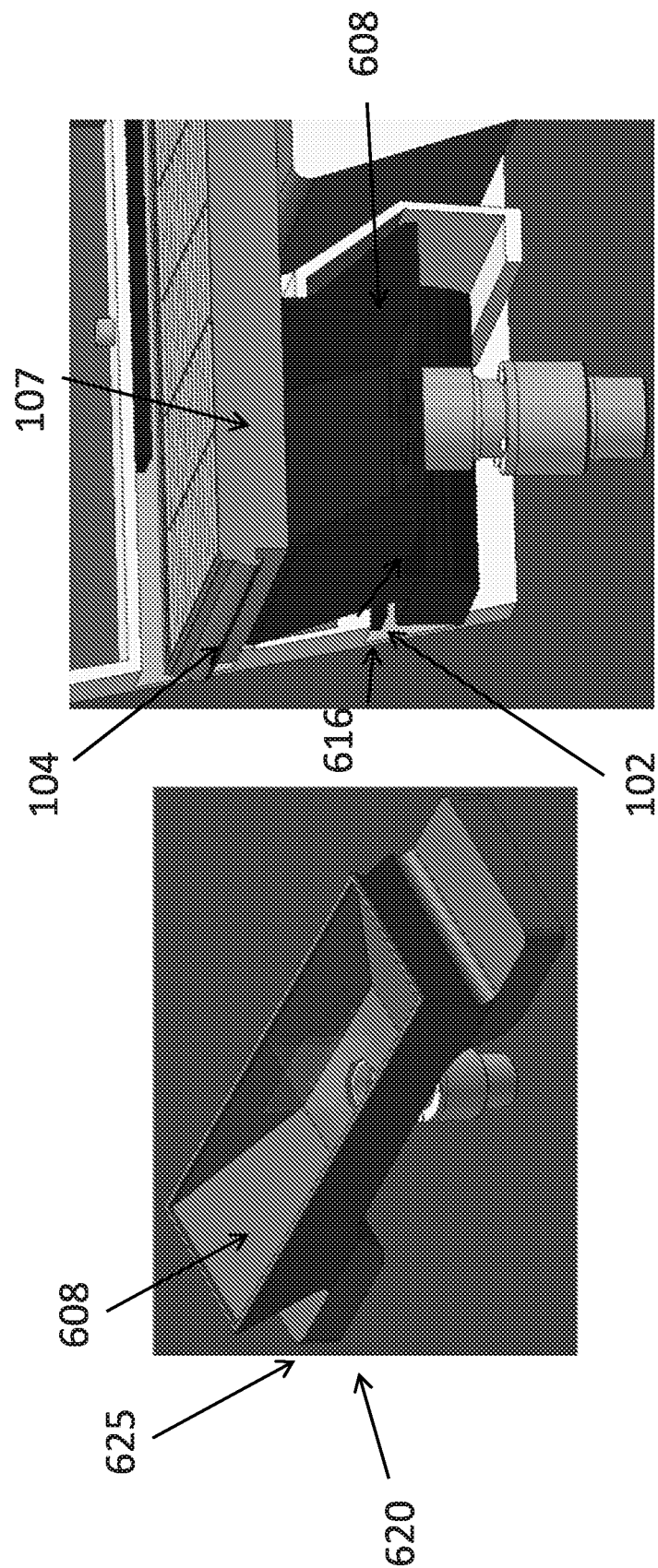

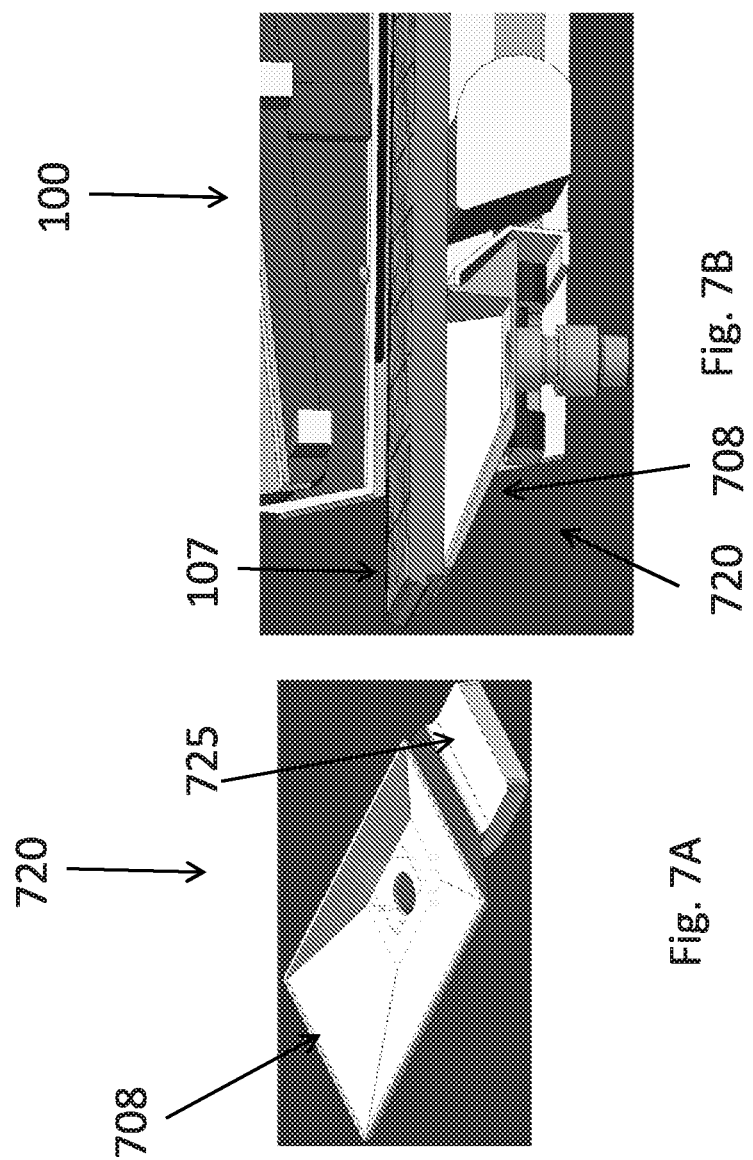

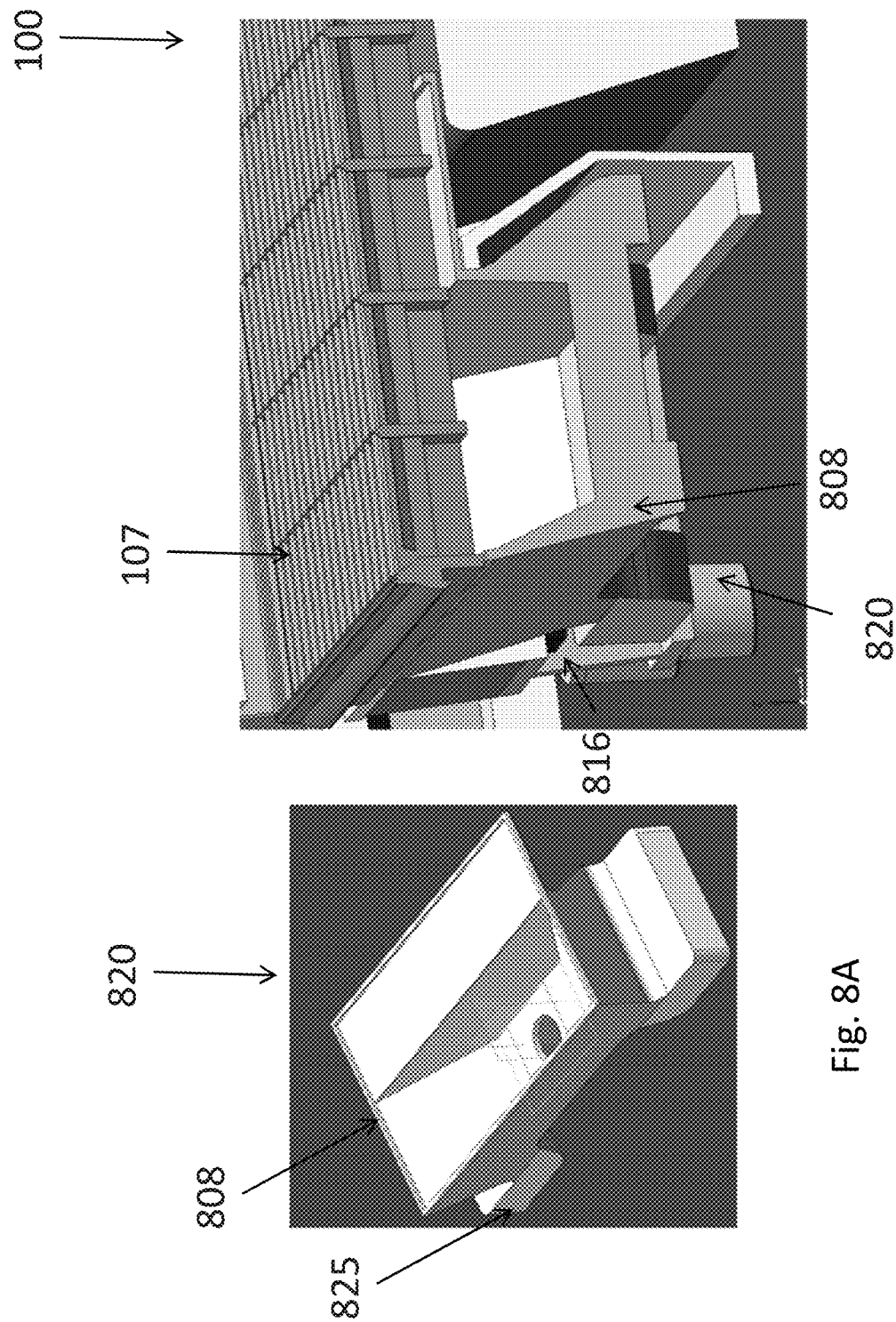

SEPARATOR AND METHOD OF SEPARATION WITH A PRESSURE DIFFERENTIAL DEVICE

CROSS-REFERENCE TO RELATED APPLICATION

The present document is based on and claims priority to U.S. Provisional Application Ser. No. 62/213,051, filed Sep. 1, 2015, which is incorporated herein by reference in its entirety.

BACKGROUND

Various industries, such as oil and gas, mining, agriculture and the like utilize equipment and/or methods to separating fluids from materials. For example, in the mining industry, the separation of a desired mineral component from the undesirable gangue of an ore is a necessary and significant aspect of mining. Tailings are the materials left over after the process of separating the valuable ore from the gangue. Mine tailings are usually produced from a mill in slurry form that is typically a mixture of fine mineral particles and water.

Another example of such a separation method is found in the oil and gas industry. For example, oilfield drilling fluid, often called "mud," serves multiple purposes in the oil and gas industry. Among its many functions, the drilling mud acts as a lubricant for a drilling bit and increases rate of penetration of the drilling bit. The mud is pumped through a bore of the drill string to the drill bit where the mud exits through various nozzles and ports, lubricating the drill bit. After exiting through the nozzles, the "spent" fluid returns to the surface through an annulus formed between the drill string and the drilled wellbore. The returned drilling mud is processed for continued use.

Another purpose of the drilling mud is to carry the cuttings away from the drill bit to the surface. The drilling fluid exiting the borehole from the annulus is a slurry of formation cuttings in drilling mud, and the cutting particulates must be removed before the mud is reused.

One type of apparatus used to remove cuttings and other solid particulates from drilling mud is commonly referred to in the industry as a "shaker" or "shale shaker." The shaker, also known as a vibratory separator, is a vibrating sieve-like table upon which returning used drilling mud is deposited and through which substantially cleaner drilling mud emerges.

The shakers use filtration screens to separate drill cuttings from drilling fluid in on-shore and off-shore oilfield drilling. The separating screens have a mesh stretched across a frame. The mesh allows particles and/or fluid below a predetermined size to pass through the separating screen. The separating screen is vibrated while the mixture of particles and/or fluids is deposited on an input side. The vibration improves separation and conveys the remaining particles to a discharge end of the separating screen.

BRIEF DESCRIPTION OF DRAWINGS

The foregoing and other features of the present disclosure will become more fully apparent from the following description, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 3A is a perspective view of a tray of a pressure differential system, according to embodiments disclosed herein;

FIG. 3B is a perspective view of the tray of FIG. 3A and a screen, according to embodiments disclosed herein;

FIG. 3C is a detail view of the tray of FIG. 3A and an adjustable mounting mechanism, according to embodiments disclosed herein;

FIG. 4A is a top perspective view of a tray of a pressure differential system according to embodiments disclosed herein;

FIG. 4B is a cross-sectional schematic of the tray and screen spacer of FIG. 4A, according to embodiments disclosed herein;

FIG. 4C is a bottom perspective schematic of the tray and screen spacer of FIG. 4A, according to embodiments disclosed herein;

FIG. 6A is a perspective view of a tray of a pressure differential system according to embodiments disclosed herein;

FIG. 6B is a cross-sectional view of the tray of FIG. 6A, according to embodiments disclosed herein;

FIG. 7A is a perspective view of a tray of a pressure differential system according to embodiments disclosed herein;

FIG. 7B is a cross-sectional view of the tray of FIG. 7A according to embodiments disclosed herein;

FIG. 8A is a perspective view of a tray of a pressure differential system according to embodiments disclosed herein; and FIG. 8B is a cross-sectional view of the tray of FIG. 8A according to embodiments disclosed herein

DETAILED DESCRIPTION

Figure 1:
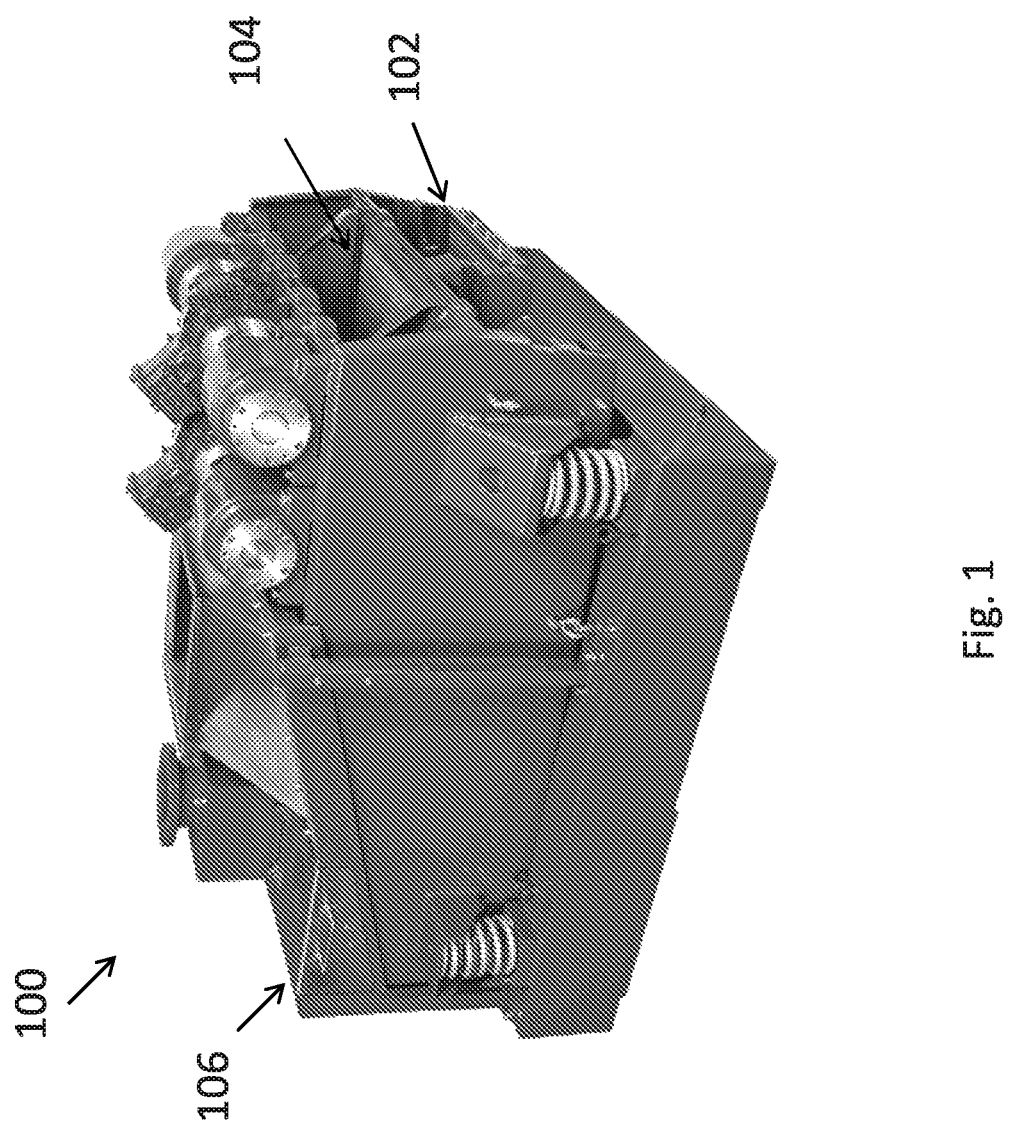
FIG. 1 is a perspective view of a vibratory separator, according to embodiments disclosed herein.

In the following detailed description, reference is made to the accompanying drawings. In the drawings, similar symbols or identifiers typically identify similar components, unless context dictates otherwise. The illustrative embodiments described herein are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

Embodiments disclosed herein generally relate to systems, devices, apparatus, and/or methods for separating components of a slurry. More specifically, embodiments disclosed herein relate to separating components of a slurry with a vibratory separator including a pressure differential device. In one or more embodiments, the pressure differential device is configured to apply a pressure differential across at least one screen of a vibratory separator to facilitate or enhance separation of components of a slurry, e.g., drilling fluid from drill cuttings. One of ordinary skill in the art will appreciate that the pressure differential may be applied across one or more portions of one or more screens. In other words, in some embodiments, the pressure differential may not be applied to an entire screen.

In accordance with embodiments disclosed herein, a device for generating a pressure differential across a screen may be coupled to a vibratory separator. Such a pressure differential generating device may be located internal or external to the vibratory separator. Coupling of the pressure differential generating device to the vibratory separator may be provided by, e.g., trays, pans, conduits, and valves, as will be discussed in more detail below, to provide fluid communication between the pressure differential generating device and at least one screen (e.g., a volume below at least one screen) of the vibratory separator. In some embodiments, the pressure differential generating device may be configured to apply a vacuum to an area below one or more screens of the vibratory separator. Examples of vibratory separators that apply a pressure differential to one or more screens of a vibratory separator are described in WO2015/081200, US2015/0048037, WO2015/024012, and U.S. Pat. No. 8,613,360, each of which is incorporated by reference herein its entirety.

In accordance with embodiments disclosed herein, a pressure differential generating device may be coupled to a vibratory separator which includes a screening deck below another screening deck, each screening deck having at least one screen. For example, a pressure generating device may be coupled to a vibratory separator having a drying deck disposed below a separation deck, such that the pressure generating device is configured to provide a pressure differential across the drying deck, the separation deck, or both the drying deck and the separation deck. In other embodiments, a pressure generating device may be coupled to a multi-deck vibratory separator, e.g., vibratory separators having two or three decks, each deck having at least one screen.

Further, in accordance with embodiments disclosed herein, existing vibratory separators may be modified or retrofitted to include a pressure differential generating device coupled to one or more screens (of one or more decks) of the existing vibratory separator.

In some embodiments, a pressure differential system including a pressure differential generating device may be coupled to the vibratory separator. The pressure differential system may further include a tray coupled to the pressure differential generating device, for example, the tray be positioned below one or more screens (of one or more decks) of the vibratory separator. The pressure differential system may also include a conduit coupled between the pressure differential generating device and an opening formed in the tray to provide fluid communication between the pressure differential generating device and a volume above the tray and below the one or more screens when installed in the vibratory separator. In some embodiments, the pressure differential system may also include a device or mechanism for mounting the tray inside the vibratory separator. The mounting mechanism may secure the tray in a position below the one or more screens to provide a pressure differential across the screen. In some embodiments, the mounting mechanism may be an adjustable mounting mechanism configured to allow for adjustable positioning of the tray within the vibratory separator. For example, in some embodiments, the position of the tray may be adjusted to raise the tray upward into closer proximity to or in contact with one or more screens or to lower the tray moving it away from the one or more screen across which the pressure differential is to be applied. In still other embodiments, the adjustable mounting mechanism may provide for adjustment of the tray to move the tray forward or backward, i.e., toward or away from the discharge and/or feed end of the vibratory separator. Thus, a pressure differential system in accordance with embodiments disclosed herein may be coupled to vibratory separators having varying sizes and configurations of screens, and the tray may be adjusted vertically and/or laterally to properly align the tray with the screen and/or contact the tray with the screen.

Referring to FIG. 1, a vibratory separator 100 may be modified to include a pressure differential system in accordance with embodiments disclosed herein. The vibratory separator 100 may have a first deck, such as a primary screening area or deck, 104 above a second or lower deck 102. In some embodiments, the lower deck 102 may be termed a "drying deck" that is situated below the primary screening area 104. Examples of a shaker having a drying deck include, but are not limited to the VSM-300 Shaker manufactured by National Oilwell Varco (NOV) (Houston, Tex.). In some embodiments, the drying deck 102 has a removable chute 106 that can be replaced with a drying screen (not shown) which may improve the solids separation efficiency and improve cuttings dryness. In some embodiments, the drying screen or chute is held in place by a pneumatic bladder (not shown).

Figure 2:
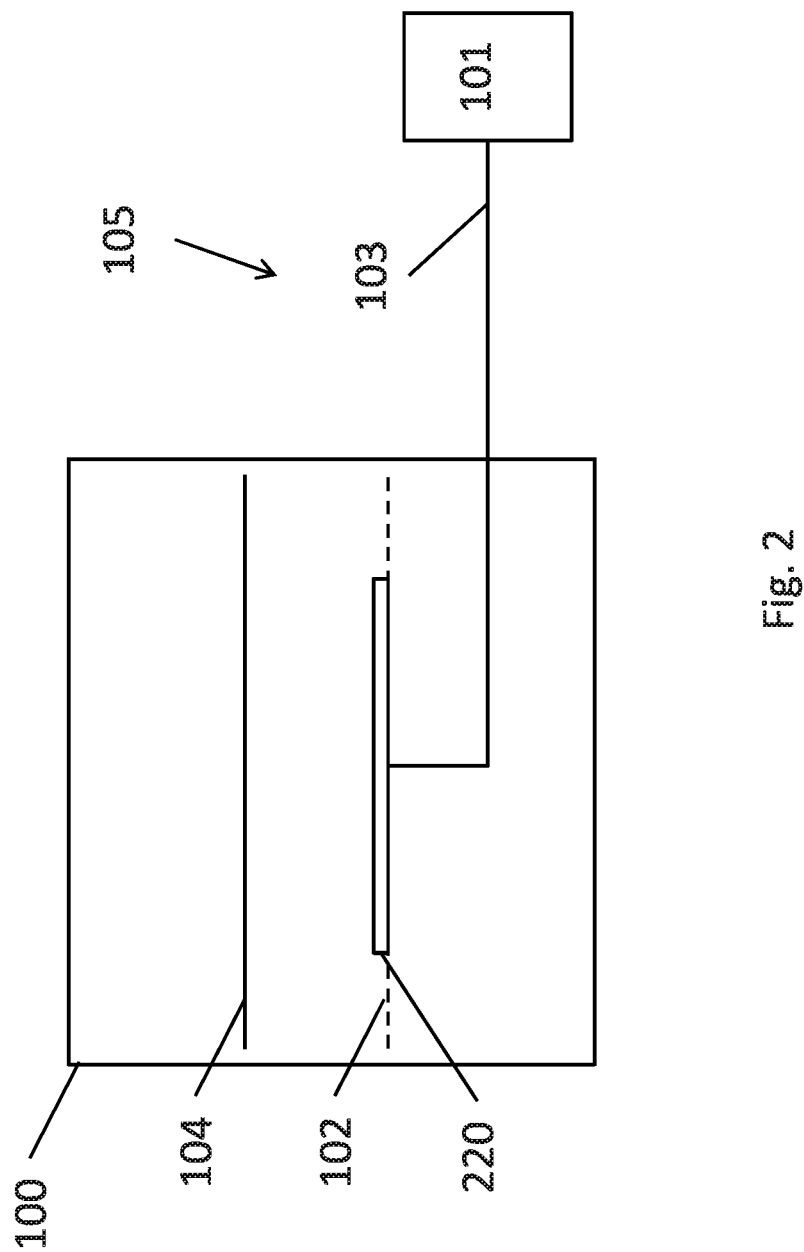
FIG. 2 is a schematic of a vibratory separator with a pressure differential system, according to embodiments disclosed herein.

In accordance with embodiments disclosed herein, the existing drying deck 102 and/or discharge chutes 106 of the vibratory separator 100 are removed and a pressure differential system is coupled to the vibratory separator 100 in place of the drying deck 102 and/or discharge chutes 106. FIG. 2 shows a schematic of the vibratory separator 100, where the removed drying deck 102 is shown as a dashed line. As shown, a tray 220 of a pressure differential system 105 is installed in place of the drying deck 102. The tray 220 may be coupled to a pressure differential generating device 101 that, when actuated, creates a pressure differential below the screen 104. The tray 220 may be approximately the same size as the drying deck 102 removed, or the tray 220 may be smaller or larger than the drying deck 102 removed. In some embodiment, the tray 220 may be configured to be installed on the same or existing support structure, so that at least one dimension, for example, the width, of the tray 220 may be approximately equal to that dimension of the removed drying deck 102.

In one embodiment, as shown in FIG. 2, the pressure differential system 105 may include a pressure differential generating device 101, such as a line vacuum, located external to the vibratory separator, and coupled to the tray 220 by conduit 103. In other embodiments, the pressure differential generating device 101 may be an air amplifier, vacuum generator, blower or a device capable of generating a pressure differential by the use of fluid, such as by those that operate in accordance with Bernoulli's principle, in particular the Venturi effect or the Coanda effect. The Venturi effect as used herein generally relates to increasing the velocity of the motive fluid provided from a fluid source from a decrease in cross-sectional area in the pressure differential generator. The Coanda effect as used herein generally relates to a stream of fluid attaching itself to a nearby surface and remaining attached even when the surface curves away from the initial jet direction. Thus, in some embodiments, the pressure differential system may include a pressure differential generating device installed inside the vibratory separator and positioned below the tray 220, the pressure differential generating device being coupled, e.g., via a conduit, to a fluid source located external to the vibratory separator. In this embodiment, the pressure differential generating device may be connected to a fluid inlet in the tray 220 through a second conduit or a second portion of the conduit coupled to the fluid source. A fluid control assembly (not shown) in the conduit may control the flow of motive fluid to the pressure differential generating device. The fluid control assembly may be, for example, a ball valve, a solenoid or any other fluid control device suitable for controlling compressed gas.

Referring to FIGS. 3A-3C, in some embodiments, the tray 220 may include a trough 208, a pan 210, or a combination of a pan 210 with a trough 208. FIGS. 3A-3C show an embodiment with a trough 208 coupled to a pan 210. The pan 210 is sized and configured to be slid into position under one or more screens of the primary screening deck 104 of the vibratory separator 100. In one embodiment, the pan 210 is configured to slide onto or into an existing support structure (116) of the vibratory separator 100. The trough 208 includes an inlet 222 configured to engage or couple with the conduit 203 to couple the trough 208 to a pressure differential generating device and/or fluid source.

In this embodiment, the trough 208 is installed below the screening deck 104 and is configured to be raised into closer proximity to or into contact with one or more screens 107. For example, a mounting mechanism 112 may couple the trough 208 to the pan 210. In some embodiments, the mounting mechanism 112 is an adjustable mounting mechanism configured to raise and/or lower the trough 208 with respect to the pan 210 and therefore with respect to the screen(s) 107. In some embodiments, the adjustable mounting mechanism 112 may include a screw-jacking mechanism that allows the trough 108 to press and seal up against the screen 107. In other embodiments an air bladder (not shown) may be inflated by a fluid medium which in turn raises the trough 208 against the screen 107. In other embodiments a wedge (not shown) may be inserted to correspond to an angled surface of the trough (208) which will in turn raise the trough 208 upward against the screen 107. While FIGS. 3A-3C show an adjustable mounting mechanism 112 coupled between the trough 208 and the pan 210, one of ordinary skill in the art will appreciate that an adjustable mounting mechanism 112 may couple a tray 220 having only a pan 210 or only a trough 208 to the vibratory separator (e.g., to a wall of support structure of the vibratory separator) and adjust the location of the pan 210 or trough 208 with respect to the vibratory separator (e.g., to a wall of support structure of the vibratory separator) and the screen(s) 107. In some embodiments, a gasket 114, seal, or other compressible material may be applied to an upper perimeter surface of the trough 208 for sealed engagement with a bottom surface of the screen(s) 107.

Referring to FIGS. 4A-4C, in some embodiments, a screen spacer may be installed in the vibratory separator to push the screen(s) 107 forward towards the discharge end of the shaker so that the screen(s) is substantially above the tray 220 that is inserted below the screening surface of the screen(s) 107. This screen spacer may be a smaller screen sized to push the screening surface over the tray 220. This small screen (screen spacer) may be installed anywhere along the screening surface. In other examples, this screen spacer may be a solid part of plastic, metal, or any other material that does not include mesh to push the screening surface of the screen(s) 107 over the tray 220. This non-meshed screen spacer (not shown) may be installed at the feed end of the vibratory separator and may include latches/hooks to correspond with latches/hooks in the screen 107 or it may be installed anywhere along the screening surface.

One of ordinary skill in the art will appreciate that while the above description provides a tray 220 at a discharge end of the vibratory separator, a tray 220 may be positioned proximate a feed end of a vibratory separator and/or at any location along the a screening deck of a vibratory separator. Similarly, the screen spacer may be inserted at the discharge end, the feed end, or at a location between screens of a deck of a vibratory separator.

Figure 5A:
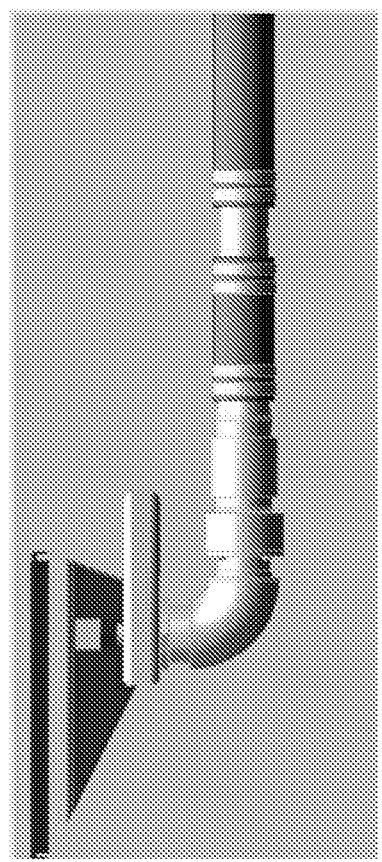
FIG. 5A is a side view of a trough of a pressure differential system according to embodiments disclosed herein.
Figure 5B:
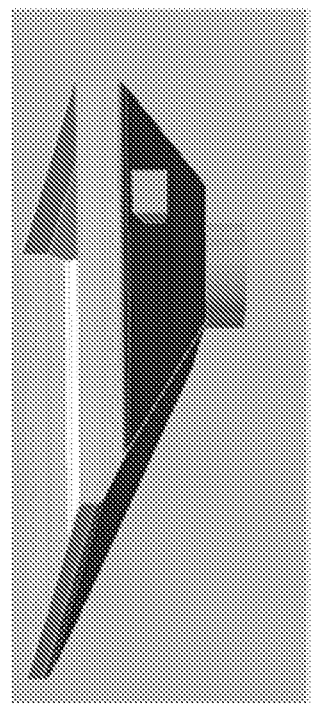
FIG. 5B is a perspective view of the trough of FIG. 5A, according to embodiments disclosed herein.

In some embodiments, the screen spacer may extend the screen(s) 107 forward from the front of a basket of the vibratory separator to allow further drying time and to allow a pressure differential to be created over a larger portion of the screening surface. Thus, the screen spacer may be selected or sized so as to move or space the screen 107 at, for example, the discharge end of the vibratory separator a predetermined distance, such that a portion of the screen 107 is outside the basket of the vibratory separator. Alternatively or additionally, as shown in FIGS. 5A and 5B, the shape and configuration of a trough 508 may vary such that the area formed by the perimeter surface of the upper end of the trough 508 corresponds to dimensions of a screen 107 inside or both inside and extending out of the basket of the vibratory separator.

In some embodiments, as shown in FIGS. 6A and 6B, the pressure differential system may include a tray 620 having a trough 608 that is positioned below a screen 107. In this embodiment, the trough 608 is not raised to contact the screen 107, but instead includes a bulb seal or similar sealing mechanism. For example, in the embodiment shown in FIGS. 6A and 6B, the tray 620 (or trough 608) is disposed in a second screening deck 102 (e.g., in the support rails for screens of the second screening deck) that is below a first screening deck 104 to which the pressure differential shall be created. As shown in FIGS. 6A and 6B, the tray 620 may include side extension portions 625 for engagement with the side screen rails or support structure 616 for the second deck 102. In other embodiments, the trough 608 may be integrally formed with a pan. In this particular embodiment, the tray 620 is secured in position using existing pneumatic bladders (i.e., bladders installed in the vibratory separator and configured to pneumatically secure a screen within the vibratory separator) which are inflated on top of a clamping surface of the tray 620. Inflation of the pneumatic bladders presses the tray 620 against the screen rails, thus securing the tray below the screen above it. The tray may be secured using any other method in the art such as bolts, wedges, adhesive, etc.

FIGS. 7A and 7B show another example of a tray 720 secured in position in the vibratory separator 100, the tray 720 having a trough 708 configured to be positioned under a screen 107 that is extending out from a basket of the vibratory separator 100, as discussed above. Thus, as shown, the trough 708 is configured to apply a pressure differential across portions of the screen 107 that are within the basket of the vibratory separator 100 and portions of the screen 107 that extend out of the basket of the vibratory separator 100. Thus, in some embodiments, a screen spacer may be installed to push the screen 107 forward towards the discharge end of the vibratory separator 100 so that the screen 107 substantially above the tray 720 that is inserted below the screen 107. This screen spacer may simply be a smaller screen sized to push the screen 107 over the tray 720. This small screen may be installed anywhere along the screen deck. In other examples, the screen spacer may be a solid part of plastic, metal, or any other material that does not include mesh to push the screen 107 over the tray 720. This non-meshed screen spacer may be installed at the feed end of the shaker and may include latches/hooks to correspond with latches/hooks in the screen or it may be installed anywhere along the screening deck. As shown in FIGS. 7A and 7B, the tray 720 may include side extension portions 725 for engagement with the side screen rails or support structure for the second deck 102. In other embodiments, the trough 708 may be integrally formed with a pan.

Referring to FIGS. 8A and 8B, in some embodiments, a screen spacer may be installed to push the screen 107 forward towards the discharge end of the vibratory separator 100 so that the screen 107 substantially above the tray 820 (and trough 808) that is inserted below the screen 107. This screen spacer may simply be a smaller screen sized to push the screen 107 over the tray 820. This small screen may be installed anywhere along the screen deck. In other examples, the screen spacer may be a solid part of plastic, metal, or any other material that does not include mesh to push the screen 107 over the tray 820. This non-meshed screen spacer may be installed at the feed end of the shaker and may include latches/hooks to correspond with latches/hooks in the screen or it may be installed anywhere along the screening surface. As shown in FIGS. 8A and 8B, the tray 820 may include side extension portions 825 for engagement with the side screen rails or support structure 816 for the second deck 102. In other embodiments, the trough 808 may be integrally formed with a pan.

While the claimed subject matter has been described with respect to a limited number of embodiments, those skilled in the art, having the benefit of this disclosure, will appreciate that other embodiments can be devised which do not depart from the scope of the claimed subject matter as disclosed herein. Accordingly, the scope of the claimed subject matter should be limited only by the attached claims.

What is claimed is:

1. A system for separating and drying solids from a slurry, comprising:
    a vibratory separator that includes a screen;
    a pressure differential generating device; and
    a tray coupled to the pressure differential generating device and disposed beneath the screen of the vibratory separator, the tray comprising
        a trough proximal or in contact with the screen,
        a pan slidably received by a support structure of the vibratory separator, and
        a mounting mechanism coupling the trough and the pan.
2. The system of claim 1, wherein the mounting mechanism is an adjustable mounting mechanism to adjust a distance between the tray and the screen of the vibratory separator.
3. The system of claim 1, further comprising a gasket disposed on an upper perimeter of the trough to create a seal between the tray and the screen of the vibratory separator.
4. The system of claim 1, wherein the pressure differential generating device generates a pressure differential across the screen by increasing a velocity of a motive fluid moving through the pressure differential generating device.
5. The system of claim 1, wherein the pressure differential generating device includes a vacuum generator.
6. The system of claim 2, wherein the adjustable mounting mechanism is a screw-jacking mechanism.
7. The system of claim 1, further comprising a screen spacer to displace a portion of the screen of the vibratory separator a selected distance outside a basket of the vibratory separator.

8. A pressure differential system for creating a pressure differential across a screen of a vibratory separator, comprising:
    a pressure differential generating device;
    a tray coupled to the pressure differential generating device, the tray comprising
        a trough including an opening and configured to be proximal or in contact with the screen,
        a pan configured to slide onto or into a support structure of the vibratory separator, and
        a mounting mechanism coupling the trough and the pan; and
    a conduit extending between the pressure differential generating device and the opening in the tray;
    wherein a volume between the tray and the screen is in fluid communication with the pressure differential generation device.
9. The pressure differential system of claim 8, wherein the mounting mechanism is an adjustable mounting mechanism to adjust a distance between the trough and the screen.
10. The pressure differential system of claim 9, further comprising a gasket disposed on an upper perimeter surface of the trough to create a fluid-tight seal between the tray and the screen.
11. The pressure differential system of claim 10, wherein the pressure differential generating device generates a pressure differential across the screen by increasing a velocity of a motive fluid moving through the pressure differential generating device.
12. The pressure differential system of claim 11, wherein the pressure differential generating device includes a vacuum generator.
13. The pressure differential system of claim 12, wherein the adjustable mounting mechanism is a screw-jacking mechanism.
14. A method of drying solids separated from a slurry in a vibratory separator, comprising:
    providing a slurry of solids mixed with a liquid to a screen of a vibratory separator; and
    actuating a pressure differential generating device, wherein:
        the pressure differential generating device is coupled by a conduit to an opening of a tray comprising
            a trough disposed beneath the screen and including the opening,
            a pan slidably received by a support structure of the vibratory separator, and
            a mounting mechanism coupling the trough and the pan;
        the tray is coupled by a gasket disposed along an upper perimeter of the trough to the screen; and
        actuating the pressure differential generating device generates a pressure differential across the screen.
15. The method of claim 14, wherein the mounting mechanism includes an adjustable mounting mechanism pressing the trough against the screen to create a fluid-tight seal.
16. The method of claim 15, wherein the pressure differential generating device generates the pressure differential across the screen by increasing a velocity of a motive fluid moving through the pressure differential generating device.
17. The method of claim 16, wherein the pressure differential generating device includes a vacuum generator.
18. The method of claim 17, wherein the adjustable mounting mechanism is a screw-jacking mechanism.

* * * * *